US008843774B2

(12) United States Patent
Chen et al.

(10) Patent No.: US 8,843,774 B2
(45) Date of Patent: Sep. 23, 2014

(54) METHOD AND APPARATUS FOR MANAGING BATTERY POWER IN RESPONSE TO AN INDICATION OF AN APPLICATION BEING SCHEDULED FOR IMMEDIATE EXECUTION

(75) Inventors: Liren Chen, San Diego, CA (US); Kirk S. Taylor, San Diego, CA (US); Jack B. Steenstra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 330 days.

(21) Appl. No.: 12/860,213

(22) Filed: Aug. 20, 2010

(65) Prior Publication Data

US 2012/0047379 A1    Feb. 23, 2012

(51) Int. Cl.
*G06F 1/26*    (2006.01)
*G06F 1/32*    (2006.01)
*H04W 52/02*    (2009.01)

(52) U.S. Cl.
CPC ............ *H04W 52/0264* (2013.01); *Y02B 60/50* (2013.01); *H04W 52/0261* (2013.01); *G06F 1/3212* (2013.01)
USPC ....................................................... 713/320

(58) Field of Classification Search
CPC . Y02B 60/50; G06F 1/3212; H04W 52/0261; H04W 52/0264
USPC .............. 718/1, 103, 104, 107; 713/300, 320; 320/127
See application file for complete search history.

(56) References Cited

U.S. PATENT DOCUMENTS 6,329,794 B1    12/2001    Oeda et al.
(Continued)

FOREIGN PATENT DOCUMENTS

GB    2466662 A    7/2010
JP    2000155626 A    6/2000
(Continued)

OTHER PUBLICATIONS

Flinn, Jason, et al., "Energy-aware adaptation for mobile applications," 17th ACM Symposium on operating Systems Principles (SOSP '99). 34(5):48-63. Dec. 1999.
International Search Report and Written Opinion—PCT/US2011/048505—ISA/EPO—Apr. 12, 2012.
Taiwan Search Report—TW100129787—TIPO—Sep. 14, 2013.

*Primary Examiner* — Thomas Lee
*Assistant Examiner* — Xuxing Chen
(74) *Attorney, Agent, or Firm* — Donald C. Kordich

(57) ABSTRACT

Techniques for managing battery power of a mobile device are described. In an aspect, battery power may be reserved for an application prior to execution of the application on the mobile device. The reservation may ensure that the application has sufficient battery power for execution. In another aspect, battery power may be allocated to applications based on their priorities. The applications may be ordered based on their priorities, and the available battery power for the mobile device may be allocated to one application at a time, starting with the highest priority application. In yet another aspect, battery power may be allocated to applications based on a battery discharge curve for the mobile device. An operating point on the battery discharge curve may be selected based on at least one objective. The available battery power may be determined based on the selected operating point and allocated to the applications.

14 Claims, 6 Drawing Sheets

(56) References Cited

U.S. PATENT DOCUMENTS

| | | |
|---|---|---|
| 2004/0041538 A1* | 3/2004 | Sklovsky ................. 320/127 |
| 2005/0268131 A1 | 12/2005 | Matsunobu |
| 2007/0188144 A1 | 8/2007 | Hara et al. |
| 2008/0015807 A1 | 1/2008 | Hong |
| 2008/0057894 A1 | 3/2008 | Aleksic et al. |
| 2008/0133956 A1 | 6/2008 | Fadell |
| 2008/0165714 A1 | 7/2008 | Dettinger et al. |
| 2008/0263375 A1 | 10/2008 | Sundstrom et al. |
| 2009/0164152 A1 | 6/2009 | Creus et al. |
| 2010/0145643 A1 | 6/2010 | Katpelly et al. |

FOREIGN PATENT DOCUMENTS

| | | |
|---|---|---|
| JP | 2006350481 A | 12/2006 |
| JP | 2007219688 A | 8/2007 |
| JP | 2009130860 A | 6/2009 |
| WO | 2008082769 A1 | 7/2008 |
| WO | WO-2008101251 A1 | 8/2008 |

* cited by examiner

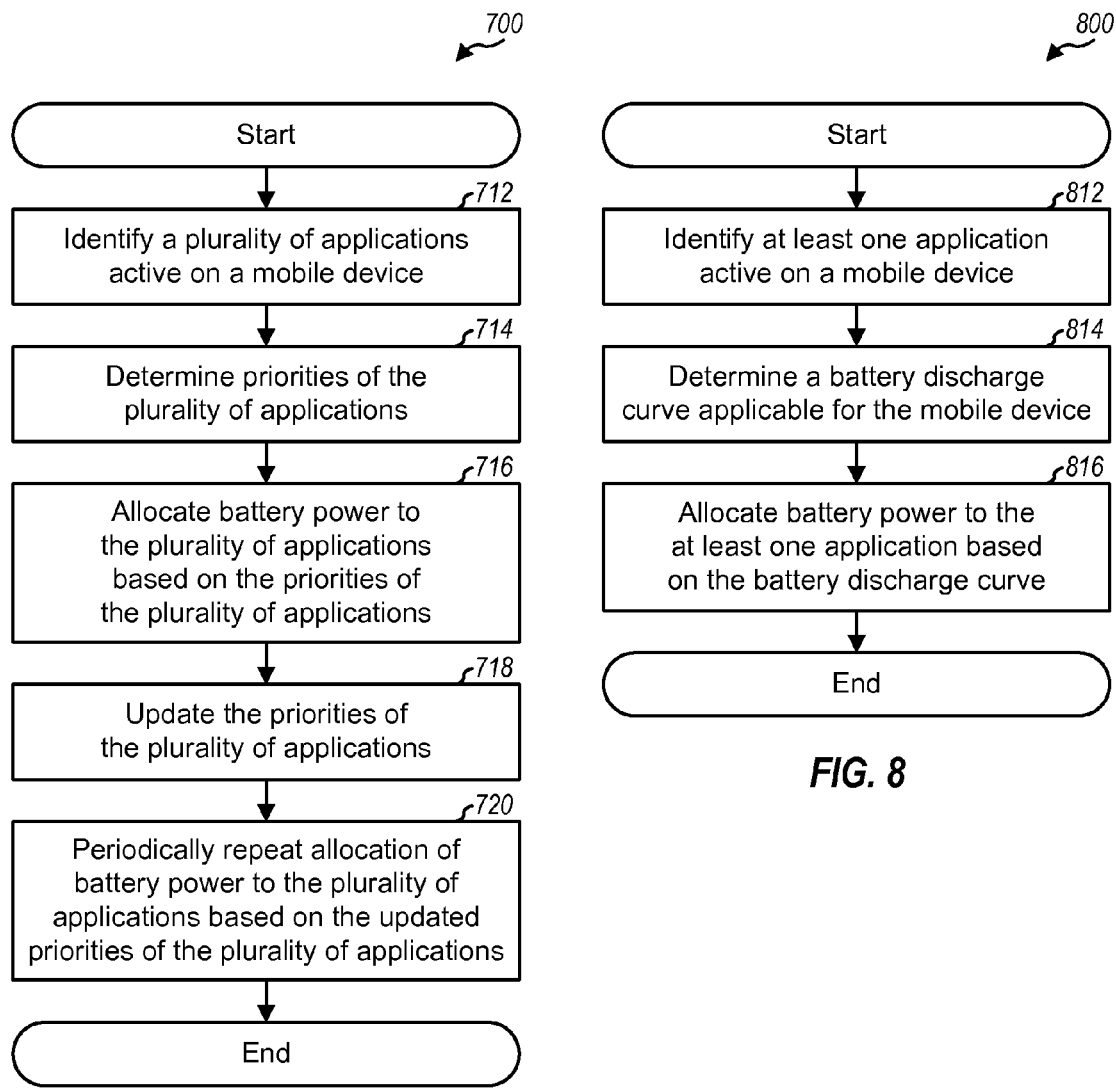

METHOD AND APPARATUS FOR MANAGING BATTERY POWER IN RESPONSE TO AN INDICATION OF AN APPLICATION BEING SCHEDULED FOR IMMEDIATE EXECUTION

BACKGROUND

1. Field

The present disclosure relates generally to electronics, and more specifically to techniques for managing a mobile device.

2. Background

Mobile devices have become an increasingly important part of everyday life for consumers. These mobile devices include cellular phones, personal digital assistants (PDAs), laptops, netbooks, etc. Computing power, data rate, and storage capability of mobile devices have grown tremendously in the past several decades and are expected to continue to grow at a rapid pace. As a result, mobile devices can presently support a number of services in addition to voice calls. For example, a smart phone may allow a user to make phone calls, browse the web, watch videos, listen to music, send instant messages, manage bank accounts, make stock trades, etc.

New services and applications are continually being offered to further enhance the usefulness of mobile devices. For example, a number of companies have been developing services and technologies to integrate cellular phones with biophysical and medical sensors to allow a user to manage his/her health and wellness conditions using a cellular phone. Furthermore, a number of network operators offer services to allow users to dynamically download applications to mobile devices, thereby further expanding the capabilities of the mobile devices.

Many services and applications available for mobile devices require processing power, multimedia processing and rendering, network connectivity, and/or personal area network support such as Zigbees and Bluetooth. These various activities typically increase power consumption of mobile devices. However, mobile devices normally operate on internal batteries and have limited battery power. Improvements in battery capacity have not matched improvements in processing power and bandwidth of mobile devices as well as an explosion of services and applications for mobile devices. Consequently, battery life of mobile devices is often a major limiting factor and a main source of complaints from users.

SUMMARY

Techniques for managing battery power of a mobile device using quality-of-service (QoS) mechanisms are described herein. The techniques can allocate battery power such that different applications may be allocated different amounts of battery power based on various considerations. The techniques may improve performance and user experience.

In an aspect, battery power may be reserved for an application prior to execution of the application on a mobile device. The reservation may ensure that the application has sufficient battery power for execution. In one design, an indication of the application becoming active may be received. Available battery power for the mobile device and required battery power for the application may be determined. The required battery power may be allocated to the application if it does not exceed the available battery power. One or more mitigation actions may be performed if the required battery power exceeds the available battery power.

In another aspect, battery power may be allocated to applications based on their priorities. In one design, applications that are active on a mobile device may be identified and their priorities may be determined. Battery power may be allocated to the applications based on their priorities. For example, the applications may be ordered based on their priorities, and the available battery power may be allocated to one application at a time, starting with the highest priority application.

In yet another aspect, battery power may be allocated to applications based on a battery discharge curve for a battery on a mobile device. In one design, at least one application that is active on the mobile device may be identified. A battery discharge curve that is applicable for the mobile device may be determined. Battery power may then be allocated to the at least one application based on the battery discharge curve. For example, an operating point on the battery discharge curve may be selected based on at least one objective such as long battery life, good performance, etc. Available battery power or current may be determined based on the selected operating point and may be allocated to the at least one application.

Various aspects and features of the disclosure are described in further detail below.

BRIEF DESCRIPTION OF THE DRAWINGS

FIG. 7 shows a process for allocating battery power to applications based on priorities.

FIG. 8 shows a process for allocating battery power based on a battery discharge curve.

DETAILED DESCRIPTION

Figure 1:
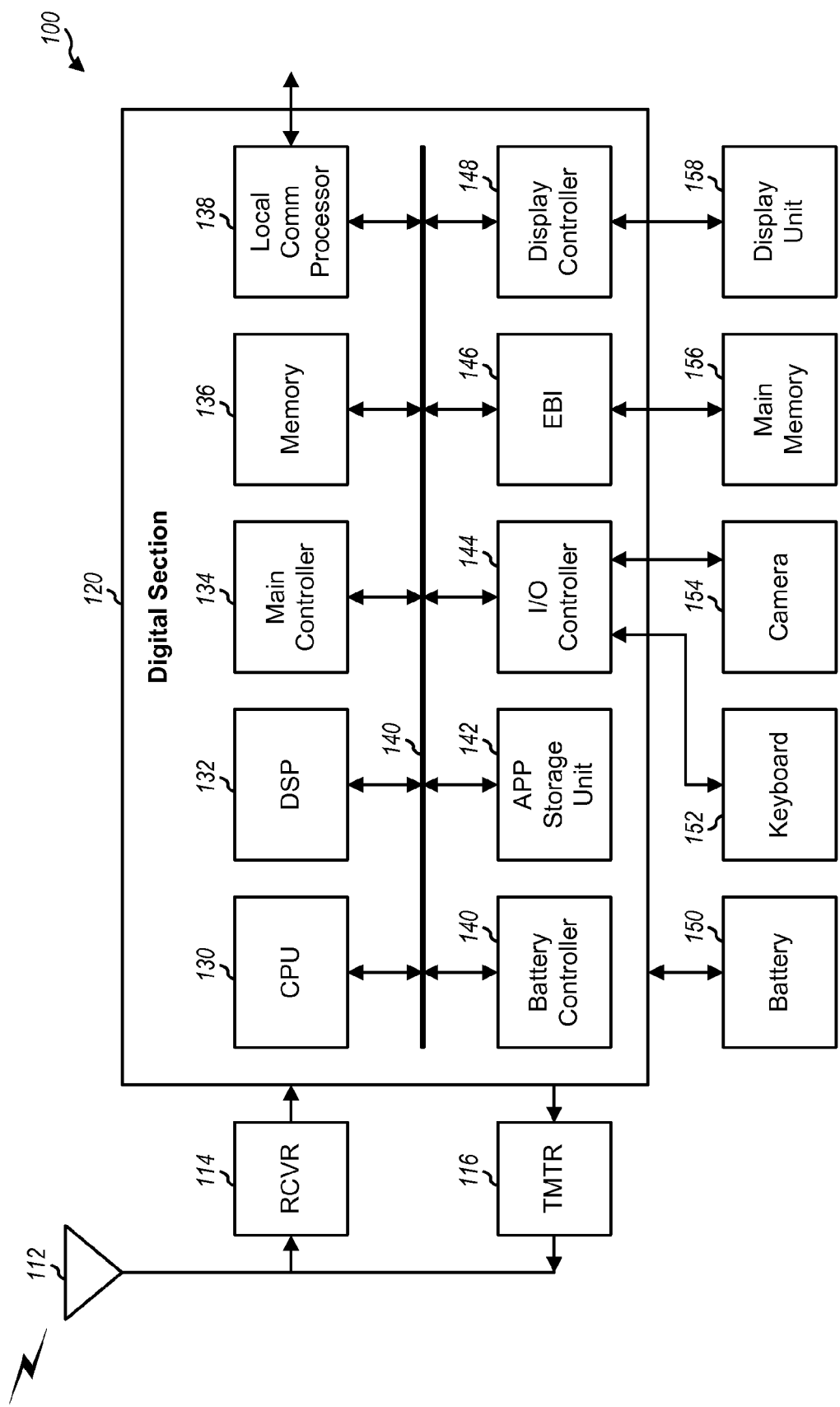
FIG. 1 shows a block diagram of a mobile device.

FIG. 1 shows a block diagram of an exemplary design of a mobile device 100. Mobile device 100 may also be referred to as a user equipment (UE), a mobile station, a terminal, an access terminal, a mobile equipment, a subscriber unit, a station, etc. Mobile device 100 may be a cellular phone, a PDA, a wireless modem, a handheld device, a laptop computer, a netbook, etc. Mobile device 100 can support bi-directional communication via a receive path and a transmit path.

In the receive path, an antenna 112 may receive signals transmitted by base stations and/or other transmitter stations and may provide a received signal to a receiver (RCVR) 114. Receiver 114 may process (e.g., filter, amplify, downconvert, and digitize) the received signal and provide input samples to a digital section 120. In the transmit path, digital section 120 may process data to be transmitted and provide output samples to a transmitter (TMTR) 116. Transmitter 116 may process (e.g., convert to analog, filter, amplify, and upconvert) the output samples and generate an uplink signal, which may be transmitted via antenna 112.

Digital section 120 may include various processing, memory, and interface units that support communication and other services. In the design shown in FIG. 1, digital section 120 includes a central processing unit (CPU) 130, a digital signal processor (DSP) 132, a main controller 134, a memory 136, a local communication (Comm) processor 138, a battery controller 140, application (APP) storage unit 142, an input/ output (I/O) controller 144, an external bus interface (EBI) 146, and a display controller 148. CPU 130 may perform processing for active applications and may include one or more reduced instruction set computer (RISC) processors, general-purpose processors, etc. DSP 132 may perform processing for communication, e.g., encoding, decoding, modulation, demodulation, ciphering, deciphering, etc. Controller 134 may direct the operation of various units at mobile device 100 and/or may perform other functions. Memory 136 may store data and/or instructions for various units within digital section 120. Processor 138 may support local communication, e.g., with a personal area network (PAN) via Zigbees, Bluetooth, etc. Battery controller 140 may manage battery power for mobile device 100, as described below.

Mobile device 100 may support a number of applications and services. An application may refer to a program that a user may directly use. A service may refer to a function that a system or a mobile device offers. For example, YouTube may be an application that a user may use and may be dependent on a number of services such as data service, graphics processing, user interface, power management, etc. Storage unit 142 may store applications supported by mobile device 100. Mobile device 100 may also support various services such as voice, packet data, web browsing, video share, video telephony, email, instant messaging, push-to-talk, multi-way calls, broadcast reception, media player, games, etc. In general, any number of applications and any one of the supported applications may be active at any given moment. Any number of services and any one of the supported services may be invoked at any given moment to support the active application(s).

I/O controller 144 may interface with external units such as a keyboard 152, a camera 154, a microphone and a speaker (not shown in FIG. 1), etc. EBI 146 may facilitate transfer of data between digital section 120 and a main memory 156, which may provide bulk storage for mobile device 100. Display controller 148 may perform processing to facilitate display of text, videos, and/or graphics on a display unit 158. Display unit 158 may be a liquid crystal display (LCD) or some other type of display. A battery 150 may provide battery power for mobile device 100.

Digital section 120 may be implemented with one or more application specific integrated circuits (ASICs) and/or some other type of integrated circuits (ICs). For example, all or most of the units in digital section 120 may be implemented on a Mobile Station Modem™ (MSM™) ASIC from Qualcomm, Incorporated, and battery controller 140 may be implemented on a Power Management IC (PMIC) also from Qualcomm, Incorporated. Battery controller 140 may also be implemented with other units in digital section 120. Receiver 114 and transmitter 116 may be implemented on one or more analog ICs, radio frequency ICs (RFICs), mixed-signal ICs, etc.

FIG. 1 shows an exemplary design of mobile device 100. In general, mobile device 100 may include fewer, more and/or different processing, memory, and interface units than those shown in FIG. 1. The number of processing units and the types of processing units in digital section 120 may be dependent on various factors such as the communication networks and services supported by mobile device 100, cost and power considerations, etc.

Mobile device 100 may include a number of subsystems, with each subsystem providing a particular functionality. For example, mobile device 100 may include an RF subsystem including receiver 114 and transmitter 116, a CPU subsystem including CPU 130, a DSP subsystem including DSP 132, a display subsystem including display controller 148 and display unit 158, a PAN subsystem including local communication processor 138, a memory subsystem including EBI 146 and memories 136 and 156, a camera subsystem including I/O controller 144 and camera 154, etc. The subsystems may also be defined in other manners. For example, receiver 114 and transmitter 116 may be considered as two separate subsystems. As another example, CPU 130 and/or DSP 132 may each be partitioned into multiple subsystems. In any case, each subsystem may be enabled when the associated functionality is needed or may be disabled otherwise to conserve battery power.

Figure 2:
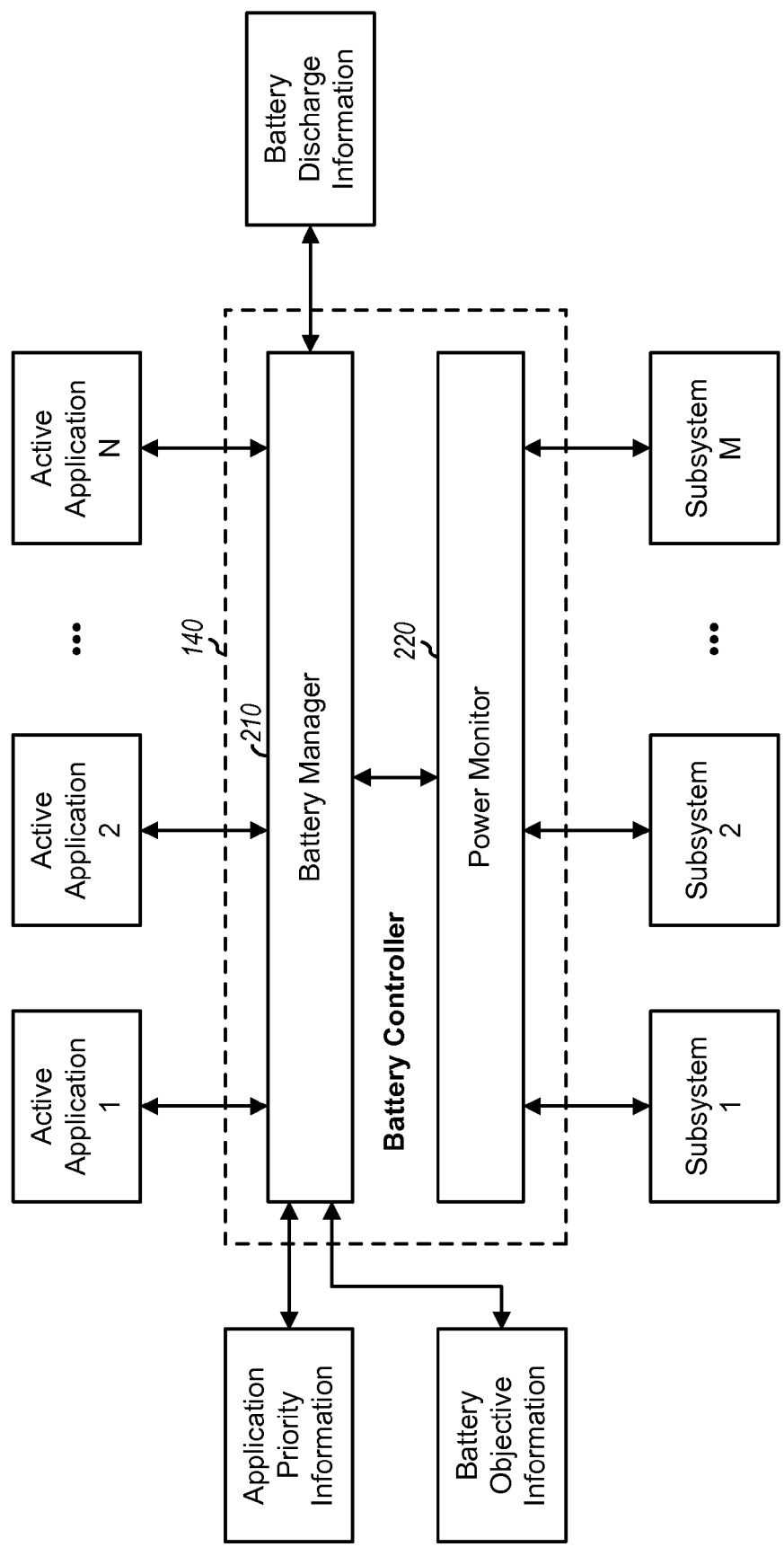
FIG. 2 shows a block diagram of a battery controller for the mobile device.

FIG. 2 shows a block diagram of an exemplary design of battery controller 140 within mobile device 100 in FIG. 1. In this design, battery controller 140 includes a battery manager 210 and a power monitor 220. Battery manager 210 may receive indications of N applications being active in mobile device 100, where N may be one or greater. In general, any number of applications may be supported by mobile device 100, and any number of applications may be active at any given moment. Battery manager 210 may also receive various types of information that may be used to allocate battery power to the active applications. For example, battery manager 210 may receive information indicative of the priorities of the applications, power consumption by various subsystems within mobile device 100, discharge curves for battery 150, objectives for battery power management, etc. Battery manager 210 may allocate battery power to the active applications based on all received information, as described below Power monitor 220 may monitor power consumption by M active subsystems within mobile device 100, where M may be one or greater. In general, mobile device 100 may include any number of subsystems, and any number of subsystems may be active at any given moment to support the active applications and other functions for mobile device 100. Power monitor 220 may determine the amount of battery power consumed by each active subsystem and may provide this information to battery manager 210. Battery manager 210 may allocate and manage battery power based on the information from power monitor 220.

In one battery power management scheme, battery power may be allocated on a first come first serve basis to active subsystems. When an application becomes active, all subsystems used to support the application may be determined. Battery power may then be allocated to each subsystem used to support the application.

In the battery power management scheme described above, battery power is essentially considered as an unlimited resource that can be freely allocated as needed. Each subsystem in mobile device 100 may be designed to consume as little power as possible. However, each subsystem that is active may draw as much battery power as it needs to operate in its preferred mode, without consideration of other subsystems. This scheme may provide unsatisfactory performance when the available battery power for mobile device 100 is insufficient to meet the power demands of all active subsystems. In this scheme, when mobile device 100 runs out of battery power, all applications may shut down regardless of their importance.

In an aspect, battery power may be considered as a limited and precious system resource and may be managed using QoS techniques. QoS refers to the ability to (i) provide different priority to different applications or data flows or (ii) guarantee a certain level of performance for an application or a data flow. For example, certain required bit rate, delay, jitter, packet error probability, and/or bit error rate may be guaranteed. QoS guarantees may be important if network capacity is insufficient to meet all of the demands. QoS guarantees may be especially desirable for real-time streaming multimedia applications such as Voice-over-Internet Protocol (VoIP), online games, and IP-TV, since these applications often require fixed bit rate and are delay sensitive. QoS guarantees may be especially applicable in communication networks (e.g., cellular networks) where capacity is limited.

A number of QoS techniques may be used for battery power management. In one design, a protocol similar to Resource Reservation Protocol (RSVP) may be used by applications to request for battery power prior to execution. RSVP is commonly used by applications to request and reserve resources through a network. For RSVP, an application can reserve some network bandwidth ahead of time. A core router may accept, maintain, and tear down the reservation. For battery power management, applications may request for battery power from battery controller 140, which can accept, maintain, or reject the request.

In another design, a scheme similar to differentiated services "DiffServ" may be used to distinguish between different applications to be executed. For DiffServ, packets may be marked according to the type of service required by each packet. In response to these markings, routers and switches may use appropriate queuing strategies to meet the requirements of the packets. For battery power management, applications may mark their requests for battery power according to the application type and/or requirements, the subsystems and/or services required by the applications, etc. The marking for a given application may indicate the priority of the application, the subsystems and/or services needed by the application, etc. The request may then be placed into an appropriate queue for further processing.

Other QoS techniques may also be used for battery power management. For example, techniques to shape traffic data and limit data rate (e.g., token bucket and leaky bucket) may be used to shape and limit battery usage for battery power management. Scheduling algorithms for traffic data (e.g., weighted fair queuing, weighted round robin, proportional fairness, etc.) may be used for allocation of battery power to applications in the same priority class.

Battery power management with QoS may entail dynamic allocation of battery power such that different applications may be allocated different amounts of battery power based on various considerations. Battery power management with QoS may be achieved based on one or more of the following. First, battery power may be requested for an application prior to execution, and battery power may or may not be allocated to the application based on various considerations, as described below. Second, applications may be prioritized, and more battery power may be allocated to higher priority applications and less (or no) battery power may be allocated to lower priority applications. Third, battery power may be managed in a dynamic manner, and battery power allocation can change over time due to changing conditions. Fourth, battery power may be allocated to achieve one or more objectives/goals related to battery life, discharging current, application performance, etc.

In one design, applications on mobile device 100 may be prioritized to aid allocation of battery power to the applications. An application may be assigned a particular priority by one or more entities and based on various factors. The priority of the application may be set by a user or based on user preferences. For example, an email application may be assigned a higher priority than a game application by the user. The priority of the application may also be set by, or based on inputs from, a network operator, an original equipment manufacturer (OEM), a third party, etc.

The priority of the application may also be set based on the amount of battery power needed to run the application. The application may require one or more subsystems, which may collectively impact the priority of the application. For example, the priority of the application may be (i) higher if the application uses subsystems that are commonly used for other applications and/or consume low power or (ii) lower if the application uses subsystems that are not usually used for other applications and/or consume high power. The priority of the application may also be set based on dependency of the application. For example, a browser application may require a data connection, which may impact the priority assigned to the browser application.

The priority of the application may also be set based on the load of a wireless network. For example, a data application that requires a high data rate may be assigned a lower priority when the wireless network is heavily loaded. Network load may be broadcast by the wireless network or may be determined indirectly, e.g., based on time of the day, day of the week, etc.

The priority of the application may also be set based on other factors. In general, the application may be assigned a particular priority based on any set of factors. The assigned priority may be dependent on the importance of the application to user preferences and system operation. The priority of the application may change over time. For example, the priority of the application may increase the longer the application has to wait before it can be executed, e.g., due to lack of battery power or contention with other applications for certain subsystems.

The applications on mobile device 100 may be grouped into different classes based on their priorities. The priorities of the applications may be used to allocate battery power to the applications when they become active.

Figure 3:
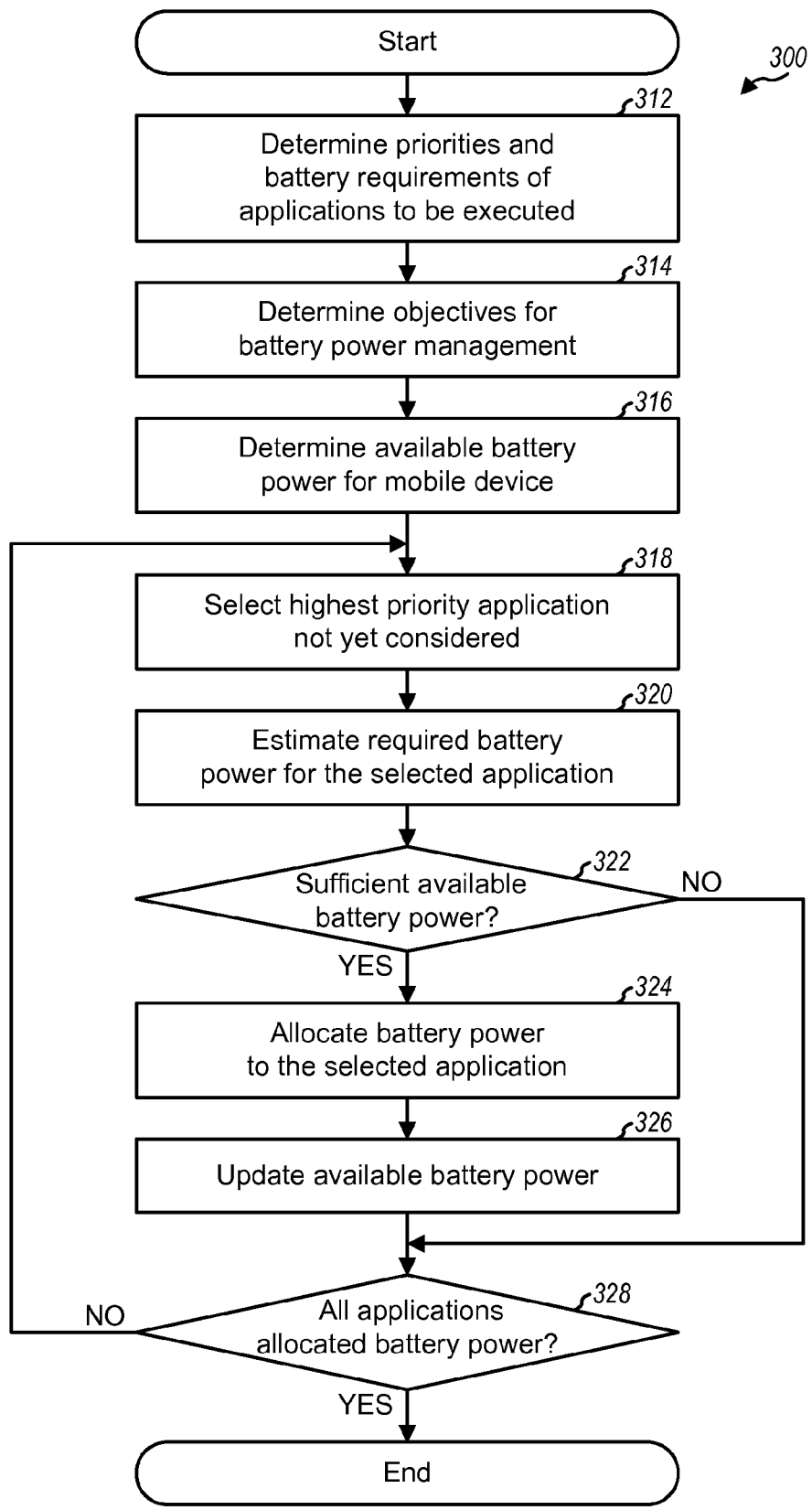
FIG. 3 shows a process for allocating battery power to applications.

FIG. 3 shows an exemplary design of a process 300 for allocating battery power to applications. Process 300 may be performed by battery controller 140 in FIGS. 1 and 2 or by some other unit within mobile device 100. In one design, process 300 may be performed for applications that have just been launched and are not yet running on mobile device 100. This design may allocate battery power to an application only once when the application is launched. In another design, process 300 may be performed for recently launched applications as well as applications that are currently running on mobile device 100. This design may allocate battery power to an application when it is launched and may change the battery power allocation when the application is running Initially, the priorities and battery requirements of all applications to be executed on mobile device 100 may be determined (block 312). These applications may include recently launched applications and possibly currently running applications. For example, the user may have one or more applications for voice and/or packet data and may also be running an email application, which may periodic check an email server for incoming emails. The user may also be running an application for Bluetooth, which may consume power on both mobile device 100 and an earpiece. The priorities of the applications may be determined as described above. The battery requirements of the applications may include the amount of current needed by each application, the duration or runtime of each application, etc.

Objectives (if any) for battery power management may be determined (block 314). The objectives may include longest stand-by time, longest battery life, maximum discharging current, largest overall battery capacity, best coverage for one or more designated applications, fair service for all applications, etc. The objectives may affect how battery power can be allocated to applications. The objectives may be specified by the user or system administrators or may be determined automatically based on QoS policy of the user. The available battery power for mobile device 100 may be determined and may be dependent on the objectives for battery power management (block 316).

The application with the highest priority may then be selected for battery power allocation (block 318). The required battery power (or battery usage) for the selected application may be estimated (block 320). This may be achieved by determining all subsystems used to support the selected application, determining the required battery power for each subsystem, and summing the required battery power for all subsystems. Each application may be associated with a particular power profile that may be used to estimate battery usage of the application. In one design, battery power may be quantified by a current and a battery capacity. Current may be indicative of usage rate and may be given in units of microAmperes (μA). Battery capacity may be indicative of total usage and may be given in units of microAmpere hours (μAh). The required current for the selected application may be estimated based on the required current for one or more subsystems used to support the application. The required battery capacity for the selected application may be estimated based on the required current as well as the frequency, duration, and usage pattern of the required subsystem(s).

A determination may then be made whether the available battery power for mobile device 100 is sufficient for allocation to the selected application (block 322). The available battery power may be sufficient if (i) the available current meets or exceeds the required current for the selected application and (ii) the available battery capacity meets or exceeds the required battery capacity for the selected application. If the available battery power is sufficient and the answer is "Yes" for block 322, then the selected application may be allocated battery power based on its required battery power (block 324). The allocation in block 324 would ensure that sufficient battery power (e.g., in terms of current draw and battery capacity) are reserved for the selected application.

The available battery power for mobile device 100 may be updated to reflect the allocation of battery power to the selected application (block 326). A determination may then be made whether all applications have been allocated battery power (block 328). If the answer is "No", then the process may return to block 318 to select another application for allocation of battery power. Otherwise, the process may terminate.

In the design shown in FIG. 3, the process may proceed from block 322 to block 328 if the available battery power is insufficient for the selected application. This design may allow the available battery power to be allocated to a lower priority application, which may consume less battery power than the selected application. In another design, the process may terminate if the available battery power is insufficient for the selected application.

In one design, process 300 may be performed whenever a new application is launched. In another design, process 300 may be performed periodically as well as when a new application is launched. In any case, process 300 may ensure that higher priority applications are allocated battery power before lower priority applications. This may improve performance and user experience when there is insufficient battery power for all applications to be executed. The design in FIG. 3 can consider the priorities of all applications to be executed, the required battery power of each application, and the available battery power for mobile device 100 to determine whether sufficient battery power is available to support a particular application. If the answer is "yes", then the application may be allocated battery power and allowed to execute. Otherwise, the user may be informed of the situation, and a list of recommendations may be provided.

In one design, the required battery power for a given application may be estimated based on the required battery power for one or more subsystems used to support the application. For example, the application may be for a mobile TV service such as MediaFLO™ service from Qualcomm, Incorporated. In order to receive the mobile TV service, the application may use a first subsystem to decode a received signal, a second subsystem to decrypt the decoded signal using service keys, a third subsystem to decode the content, a fourth subsystem to render video and audio signals, a fifth subsystem to manage the user interface, etc. The application may also use a data link to provide usage tracking and feedbacks to a backend system, and one or more subsystems may be used for the data link. The subsystems may have certain power requirements and may be evaluated together to ensure that there is enough battery power for the application.

In one design, the required battery power for an application may be estimated based on the incremental amount of battery power needed to support the application. The application may use one or more subsystems, and each subsystem may support any number of applications. For each subsystem, the amount of battery power consumed by the subsystem to support other applications (if any) may be determined. The total amount of battery power consumed by the subsystem to support all applications including this application may also be estimated. The incremental amount of battery power needed by the subsystem to support the application may then be determined based on the difference between (i) the total amount of battery power used to support all applications and (ii) the amount of battery power used to support the other applications. The required battery power for the application may then be equal to the sum of the incremental amounts of battery power needed by all subsystems to support the application. This design may ensure that the application is charged with only the extra battery power needed to support the application.

In one design, feedbacks may be provided to a user and/or an application if the available battery power is insufficient for the application due to prior commitment and allocation to other applications. The user and/or the application may then take mitigation actions/measures. In one design, the operation of the application may be altered by the application in order to reduce power consumption. For example, the application may be an email application, and the frequency that the application checks an email server may be reduced in order to reduce power consumption. In another design, the priority of the application may be increased higher than the priorities of other applications being executed. Process 300 may then be performed again with the application having the updated priority.

In another design, one or more subsystems or components on mobile device 100 may be disabled or modified in order to reduce power consumption and increase the available battery power. For example, a subsystem for Bluetooth may be turned off to save power consumption. As another example, the display unit may be dimmed, or shown at lower resolution, or refreshed less frequently to reduce power consumption.

In yet another design, one or more lower priority applications that have been allocated battery power previously may be disabled in order to increase the available battery power. For example, an email application that was allocated battery power previously may be shut down, and the battery power allocated to this email application may be reclaimed.

In yet another design, a set of applications with common dependency may be selected for allocation of battery power. This set may include the most applications that can be supported by the available battery power. This design may reduce overall battery power needed to support the applications.

In yet another design, certain tasks on mobile device 100 may be moved to the network side to reduce power consumption. For example, decoding tasks may be moved to the network side. In yet another design, operation on the network side may be altered to reduce power consumption on mobile device 100. For example, emails with only subject line may be sent to mobile device 100, and attachments may be temporary stored on the network side or deleted.

Other mitigation actions may also be taken to reduce power consumption by a requesting application, or applications already allocated battery power, or subsystems running on mobile device 100. Process 300 may be performed again based on any update for the requesting application and/or the available battery power.

In one design, a user may be provided with a list of possible mitigation actions if the available battery power is insufficient for all applications to be executed. This list may include any of the mitigation actions described above. The user may select a mitigation action from the list. Battery power may then be allocated based on the mitigation action selected by the user.

In another aspect, battery power may be allocated by taking into consideration a battery discharge curve for battery 150 on mobile device 100. Battery 150 may be rated with a particular capacity (e.g., 1500 μAh) at a particular current draw (300 μA). However, the life of battery 150 may be a non-linear function of current draw.

Figure 4:
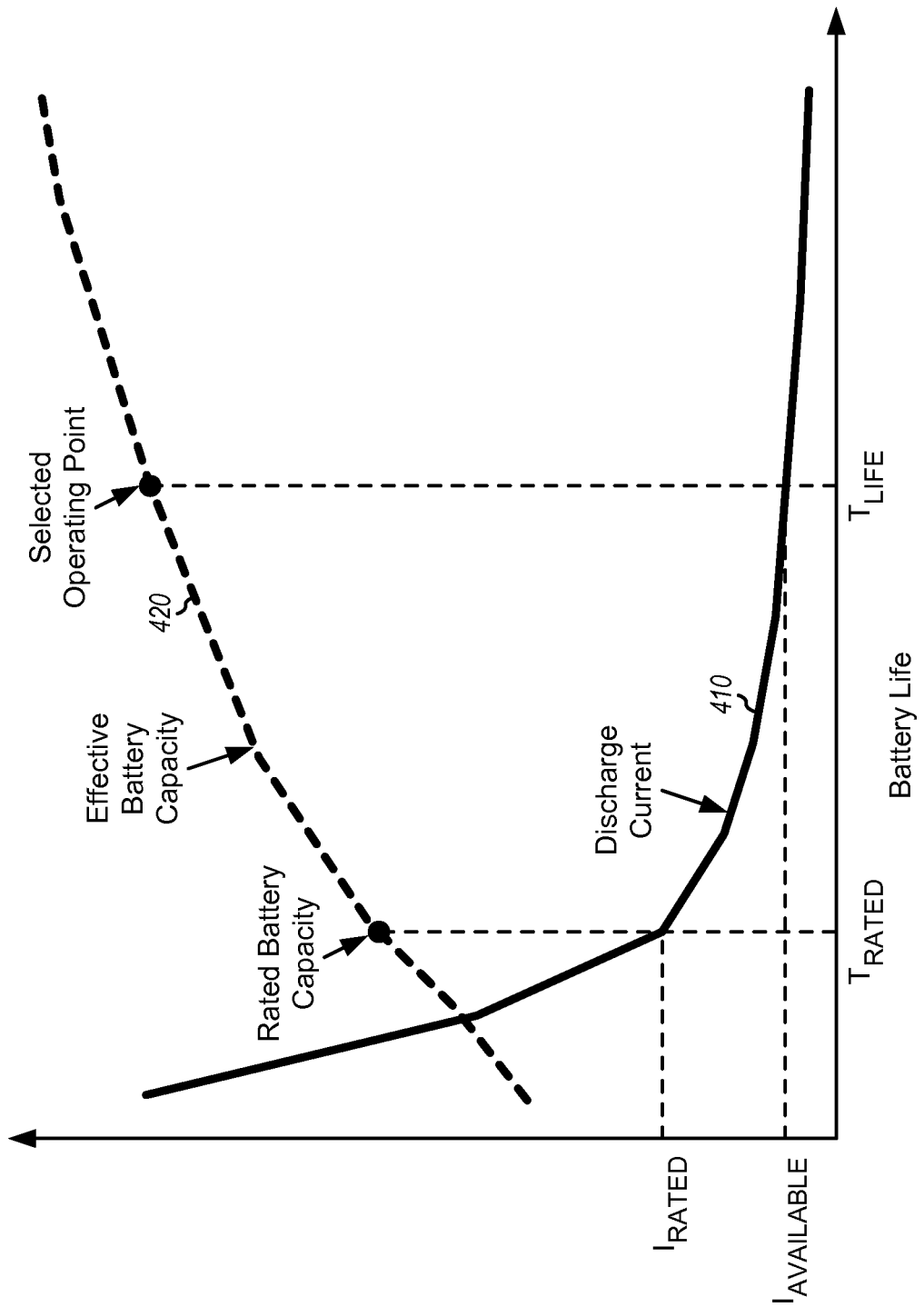
FIG. 4 shows a plot of a battery discharge curve.

FIG. 4 shows an exemplary plot 410 of a battery discharge curve and an exemplary plot 420 of effective capacity of battery 150 on mobile device 100. In FIG. 4, the left vertical axis denotes current, the right vertical axis (not drawn) denote battery/cell capacity, and the horizontal axis denotes battery life. The battery discharge curve may indicate the life of battery 150 for different amounts of current draw. Battery 150 may have a particular rated capacity at a particular rated current draw ($I_{RATED}$), which may map to a particular battery life ($T_{RATED}$). The battery life may be extended with a lower current draw or shortened with a higher current draw. For example, an operating point on the battery discharge curve may be selected to obtain longer battery life. This operating point may be associated with an available current of $I_{AVAILBLE}$ and a battery life of $T_{LIFE}$. In general, battery life may be a non-linear function of current draw, as shown in FIG. 4. Furthermore, the effective battery capacity may also be a non-linear function of current draw, as also shown in FIG. 4.

Different batteries may have different battery discharge curves. Furthermore, the battery discharge curve for a given battery may vary due to battery age, operating environment (temperature), state of charge, etc. The capacity and life of a battery may degrade with repeated charging and discharging of the battery.

In one design, battery discharge curves for different scenarios may be determined (e.g., empirically) for battery 150 and may be stored in mobile device 100. The different scenarios may correspond to different state of charge for battery 150 (e.g., one bar, two bars, etc.), different temperatures, etc. A battery discharge curve for the most appropriate scenario may be considered when allocating battery power to applications to ensure that battery 150 is operating under the most suitable conditions to prolong its useful life. For example, if battery 150 is low on power and extending battery life is an important objective, then battery power may be allocated to applications such that the current draw is as low as possible. Conversely, if battery 150 is fully charged and high data rate is an important objective, then battery power may be allocated to applications to allow higher current draw.

Battery power may be allocated based on the state of charge of battery 150, the desire objectives, and/or other factors. The battery discharge curve for the current state of charge may be used to aid allocation of battery power (e.g., to limit the current draw) so that the desire objectives can be achieved.

In yet another aspect, battery power management for mobile device 100 may be performed in a distributed manner. A power controller may be maintained on the network side and may control operation of mobile device 100 to achieve good performance. In one design, a QoS request may be sent to a network and may include a parameter for battery power. For example, a request may ask for access but to use no more than X amount of battery power. The battery power level in the request may be used to control communication with mobile device 100. For example, the bandwidth allocated to mobile device 100 and/or the delay may be maintained such that prolonged operation by mobile device 100 can be avoided. The power controller on the network side may improve battery life of mobile device 100 by modifying the access of mobile device 100 relative to those of other mobile devices.

The techniques described herein may ensure that important and preferred applications can receive higher priority in battery power allocation. By estimating battery usage and allocating battery power ahead of time, the techniques can ensure that sufficient battery power is reserved for the applications to provide good user experience. The techniques can also provide a mechanism for the user to dynamically adjust the battery power allocation to tailor to user preferences. Furthermore, battery power allocation may be such that the battery can operate in a desired discharging range, which may prolong battery life and minimize the need for battery replacement.

Figure 5:
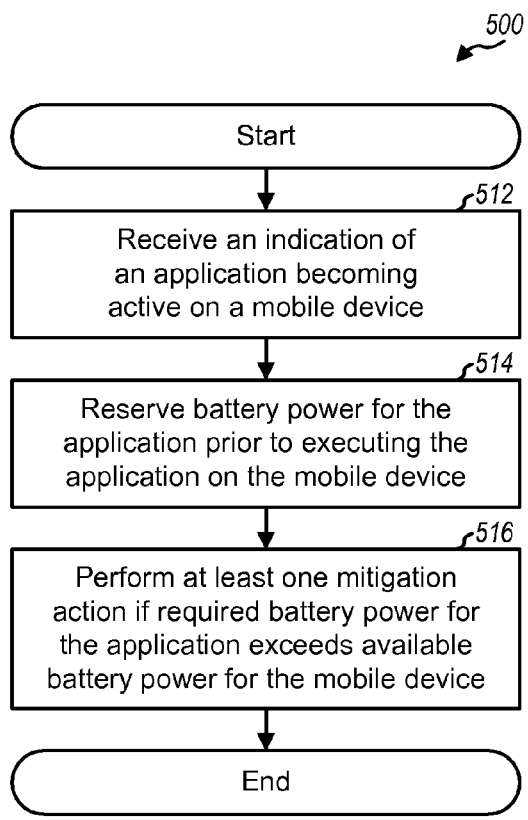
FIG. 5 shows a process for allocating battery power to an application prior to execution.

FIG. 5 shows a design of a process 500 for managing battery power. An indication of an application becoming active on a mobile device may be received (block 512). Battery power may be reserved for the application prior to executing the application on the mobile device (block 514). Battery power may be reserved for the application if the required battery power for the application does not exceed the available battery power for the mobile device. Otherwise, at least one mitigation action may be performed to increase the available battery power for the mobile device (block 516). The mitigation action(s) may include adjusting data rate, or lowering video quality, or reducing screen brightness, or disabling one or more subsystems of the mobile device, or disabling one or more applications running on the mobile device, or some other mitigation action, or a combination thereof. In one design, a list of possible mitigation actions to reduce power consumption by the application or the mobile device may be provided. A selection of a mitigation action from the list may be received, e.g., from the user. The selected mitigation action may then be performed to reduce power consumption by the application or the mobile device.

Figure 6:
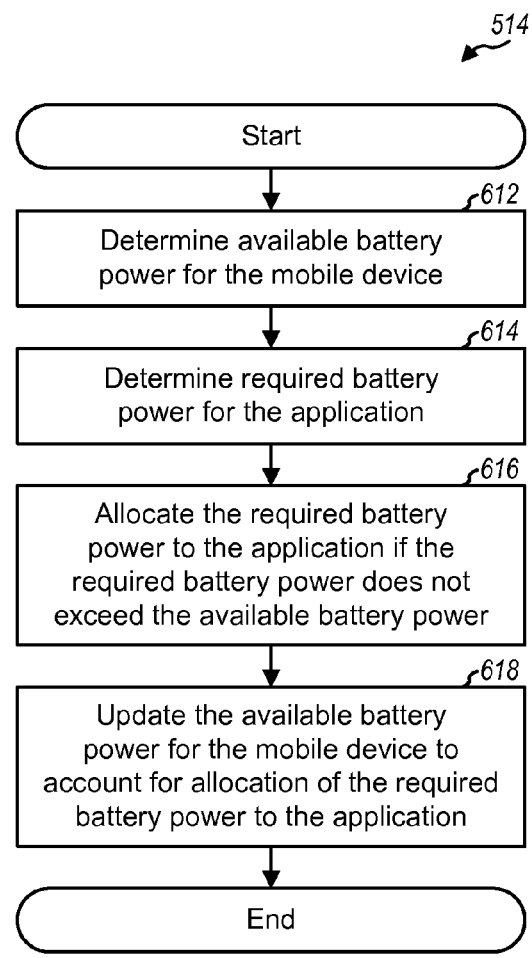
FIG. 6 shows a process for reserving battery power for an application.

FIG. 6 shows a design of block 514 in FIG. 5. The available battery power for the mobile device may be determined (block 612). The required battery power for the application may also be determined (block 614). The required battery power may be allocated to the application if it does not exceed the available battery power (block 616). The available battery power for the mobile device may be updated to account for allocation of the required battery power to the application (block 618).

In one design of block 614, the required battery power for the application may be determined by identifying at least one subsystem of the mobile device used by the application. The battery power consumed by the at least one subsystem to support the application may be estimated. The required battery power for the application may then be determined based on the estimated battery power consumed by the at least one subsystem.

A given subsystem may be shared by multiple applications, which may include the application and at least one other active application. The battery power consumed by the subsystem to support the application may be determined as follows. Battery power consumed by the subsystem to support the at least one active application may be estimated. Total battery power consumed by the subsystem to support the application and the at least one active application may also be estimated. The battery power consumed by the subsystem to support the application may then be estimated based on the difference between (i) the total battery power consumed by the subsystem to support the application and the at least one active application and (ii) the battery power consumed by the subsystem to support the at least one active application.

In one design, battery power may be quantified based on current. The required current for the application may be allocated to the application if it does not exceed the available current for the mobile device. In another design, battery power may be quantified based on battery capacity. The required battery capacity for the application may be allocated to the application if it does not exceed the available battery capacity for the mobile device. In yet another design, battery power may be quantified based on both current and battery capacity. The required current and the required battery capacity for the application may be allocated to the application if they do not exceed the available current and the available battery capacity, respectively, for the mobile device.

FIG. 7 shows a design of a process 700 for managing battery power. A plurality of applications active on a mobile device may be identified (block 712). Priorities of the plurality of applications may be determined (block 714). The priority of each application may be determined based on user input, or user preferences, or priority information associated with the application (which may be provided by the application via a mechanism similar to RSCP), or a marking used to differentiate the application from other applications (which may be provided via a mechanism similar to DiffServ), or some other information, or any combination thereof.

Battery power may be allocated to the plurality of applications based on their priorities (block 716). In one design, available battery power for the mobile device may be determined. The plurality of applications may be ordered/ranked based on their priorities. The available battery power may then be allocated to one application at a time, starting with the highest priority application among the plurality of applications, e.g., as shown in FIG. 3. If the available battery power is insufficient for all of the applications, then one or more mitigation actions may be performed, as described above.

In one design, the priorities of the plurality of applications may be updated, e.g., periodically or when triggered (block 718). For example, the priority of each application may be updated based on the performance of the application, or how long the application has waited to be allocated battery power, or some other consideration, or a combination thereof. Allocation of battery power to the plurality of applications may be repeated based on the updated priorities of the plurality of applications (block 720).

FIG. 8 shows a design of a process 800 for managing battery power. At least one application active on a mobile device may be identified (block 812). A battery discharge curve applicable for the mobile device may be determined (block 814). Battery power may be allocated to the at least one application based on the battery discharge curve (block 816).

In one design, battery requirements of the at least one application may also be determined. Battery power may then be allocated to the at least one application based further on the battery requirements of the at least one application.

In one design, at least one objective related to battery power for the mobile device may be determined. The at least one objective may comprise longest discharging time, or longest standby time, or longest battery life, or largest overall battery capacity, or best performance for one or more designated applications, or fair service for the at least one application, or some other objective, or a combination thereof. Battery power may then be allocated to the at least one application based further on the at least one objective. For example, an operating point on the battery discharge curve may be selected based on the at least one objective, e.g., as shown in FIG. 4. The available battery power (or the available current) for the mobile device may be determined based on the selected operating point. The available battery power or current may then be allocated to the at least one application.

The techniques described herein may be implemented in hardware (e.g., on an ASIC) or in software. The techniques may be implemented on existing power management circuitry such as a PMIC. The techniques may also be implement on a battery. The techniques may utilize (i) an interface between the battery and the rest of a mobile device and (ii) an interface between the mobile device and accessory devices such as a sensor, a Bluetooth earphone, etc. The accessory devices may have direct or indirect impact on power consumption of the mobile device.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of managing battery power, comprising:
  receiving an indication of an application being scheduled for immediate execution on a mobile device;
  determining available battery power for the mobile device;
  determining required battery power for the application without user input; and
  reserving battery power for the application prior to executing the application on the mobile device,
  wherein the determining required battery power for the application comprises: identifying at least one subsystem of the mobile device used by the application, estimating battery power consumed by the at least one subsystem to support the application, and determining the required battery power for the application based on the estimated battery power consumed by the at least one subsystem to support the application, and
  wherein the estimating battery power consumed by the at least one subsystem to support the application comprises: identifying a subsystem used by the application and at least one active application, the subsystem being one of the at least one subsystem supporting the application, and estimating battery power consumed by the subsystem to support the application based on a difference between total battery power consumed by the subsystem to support the application and the at least one active application and battery power consumed by the subsystem to support the at least one active application.

2. The method of claim 1, wherein the reserving battery power for the application comprises
  allocating the required battery power to the application if the required battery power does not exceed the available battery power, and
  updating the available battery power for the mobile device to account for allocation of the required battery power to the application.

3. The method of claim 2, wherein battery power is quantified based on current, and wherein required current for the application is allocated to the application if the required current does not exceed available current for the mobile device.

4. The method of claim 2, wherein battery power is quantified based on battery capacity, and wherein required battery capacity for the application is allocated to the application if the required battery capacity does not exceed available battery capacity for the mobile device.

5. The method of claim 1, wherein the reserving battery power for the application comprises
  reserving battery power for the application if required battery power for the application does not exceed available battery power for the mobile device, and
  performing at least one mitigation action if the required battery power for the application exceeds the available battery power for the mobile device.

6. The method of claim 5, wherein the performing at least one mitigation action comprises adjusting data rate, or lowering video quality, or reducing screen brightness, or disabling one or more subsystems of the mobile device, or disabling one or more applications running on the mobile device, or a combination thereof to increase the available battery power for the mobile device.

7. The method of claim 5, wherein the performing at least one mitigation action comprises
  providing a list of possible mitigation actions to reduce power consumption by the application or the mobile device,
  receiving a selection of a mitigation action from the list of possible mitigation actions, and
  performing the mitigation action to reduce power consumption by the application or the mobile device.

8. An apparatus for managing battery power, comprising:
  means for receiving an indication of an application being scheduled for immediate execution on a mobile device;

means for determining available battery power for the mobile device;

means for determining required battery power for the application without user input; and means for reserving battery power for the application prior to executing the application on the mobile device, wherein the means for determining required battery power for the application comprises: means for identifying at least one subsystem of the mobile device used by the application, means for estimating battery power consumed by the at least one subsystem to support the application, and means for determining the required battery power for the application based on the estimated battery power consumed by the at least one subsystem to support the application, wherein the means for estimating battery power consumed by the at least one subsystem to support the application comprises: means for identifying a subsystem used by the application and at least one active application, the subsystem being one of the at least one subsystem supporting the application, and means for estimating battery power consumed by the subsystem to support the application based on a difference between total battery power consumed by the subsystem to support the application and the at least one active application and battery power consumed by the subsystem to support the at least one active application.

9. The apparatus of claim 8, wherein the means for reserving battery power for the application comprises
means for allocating the required battery power to the application if the required battery power does not exceed the available battery power, and
means for updating the available battery power for the mobile device to account for allocation of the required battery power to the application.

10. The apparatus of claim 8, wherein the means for reserving battery power for the application comprises
means for reserving battery power for the application if required battery power for the application does not exceed available battery power for the mobile device, and
means for performing at least one mitigation action if the required battery power for the application exceeds the available battery power for the mobile device.

11. An apparatus for managing battery power, comprising:
at least one processor configured to receive an indication of an application being scheduled for immediate execution on a mobile device, to determine available battery power for the mobile device, to determine required battery power for the application without user input, and to reserve battery power for the application prior to executing the application on the mobile device, wherein the at least one processor is further configured to identify at least one subsystem of the mobile device used by the application, to estimate battery power consumed by the at least one subsystem to support the application, and to determine the required battery power for the application based on the estimated battery power consumed by the at least one subsystem to support the application, wherein the at least one processor is further configured to identify a subsystem used by the application and at least one active application, the subsystem being one of the at least one subsystem supporting the application, and to estimate battery power consumed by the subsystem to support the application based on a difference between total battery power consumed by the subsystem to support the application and the at least one active application and battery power consumed by the subsystem to support the at least one active application.

12. The apparatus of claim 11, wherein the at least one processor is configured to allocate the required battery power to the application if the required battery power does not exceed the available battery power, and to update the available battery power for the mobile device to account for allocation of the required battery power to the application.

13. The apparatus of claim 11, wherein the at least one processor is configured to reserve battery power for the application if required battery power for the application does not exceed available battery power for the mobile device, and to perform at least one mitigation action if the required battery power for the application exceeds the available battery power for the mobile device.

14. A computer program product, comprising:
a non-transitory computer-readable medium comprising:
code for causing at least one computer to receive an indication of an application being scheduled for immediate execution on a mobile device,
code for causing at least one computer to determine available battery power for the mobile device,
code for causing the at least one computer to determine required battery power for the application without user input,
code for causing the at least one computer to allocate the required battery power to the application if the required battery power does not exceed the available battery power, and
code for causing the at least one computer to update the available battery power for the mobile device to account for allocation of the required battery power to the application,
wherein the code for causing the at least one computer to determine required battery power for the application comprises: code for causing the at least one computer to identify at least one subsystem of the mobile device used by the application, code for causing the at least one computer to estimate battery power consumed by the at least one subsystem to support the application, and code for causing the at least one computer to determine the required battery power for the application based on the estimated battery power consumed by the at least one subsystem to support the application,
wherein the code for causing the at least one computer to estimate battery power consumed by the at least one subsystem to support the application comprises: code for causing the at least one computer to identify a subsystem used by the application and at least one active application, the subsystem being one of the at least one subsystem supporting the application, and code for causing the at least one computer to estimate battery power consumed by the subsystem to support the application based on a difference between total battery power consumed by the subsystem to support the application and the at least one active application and battery power consumed by the subsystem to support the at least one active application.

* * * * *